US006317793B1

(12) United States Patent
Toyosawa

(10) Patent No.: US 6,317,793 B1
(45) Date of Patent: Nov. 13, 2001

(54) METHOD AND SYSTEM FOR CONNECTING COMMUNICATION DEVICES UTILIZING CONNECTION INFORMATION OBTAINED FROM A SERVER ON A NETWORK

(75) Inventor: Haruhiko Toyosawa, Satte (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/859,453

(22) Filed: May 20, 1997

(30) Foreign Application Priority Data

May 21, 1996 (JP) .................................................. 8-125628

(51) Int. Cl.[7] .................................................... G06F 13/00
(52) U.S. Cl. .............................................................. 709/228
(58) Field of Search ........................... 370/601; 709/249, 709/218, 223, 250, 203, 217, 219, 227, 228

(56) References Cited

U.S. PATENT DOCUMENTS

| 5,578,088 | * | 11/1996 | Bezaire et al. ............................. 9/232 |
| 5,717,737 | * | 2/1998 | Doviak et al. ........................... 379/58 |
| 5,745,556 | * | 4/1998 | Ronen ...................................... 379/127 |
| 5,745,689 | * | 4/1998 | Yeager et al. ........................... 709/206 |
| 5,845,267 | * | 12/1998 | Ronen ...................................... 705/40 |
| 5,918,172 | * | 6/1999 | Saunders et al. ..................... 455/404 |
| 5,970,126 | * | 10/1999 | Bowater et al. ....................... 379/114 |
| 5,991,639 | * | 11/1999 | Rautiola et al. ...................... 455/553 |
| 6,009,469 | * | 12/1999 | Mattaway et al. .................... 709/227 |
| 6,012,100 | * | 1/2000 | Frailong et al. ....................... 709/250 |
| 6,023,470 | * | 2/2000 | Lee et al. ............................... 370/401 |
| 6,026,296 | * | 2/2000 | Sanders, III et al. ................. 455/426 |
| 6,029,147 | * | 2/2000 | Horadan et al. ....................... 705/35 |
| 6,108,329 | * | 8/2000 | Oyama et al. ......................... 370/352 |
| 6,108,704 | * | 8/2000 | Hutton et al. ......................... 709/227 |

* cited by examiner

Primary Examiner—Moustafa M. Meky
(74) Attorney, Agent, or Firm—Jeanine S. Ray-Yarletts; Bracewell & Patterson, L.L.P.

(57) ABSTRACT

Automatic connection to a communication device is enabled based on connection information for the communication device which is obtained from a server on a network. Further, it is ensured that information obtained from a server across a network will be converted into information that is useable by the type of the communication device, and that the converted information will be transmitted to the communication device.

A server on the Internet stores a telephone number, which is used for a connection to a communication device that exists on a public telephone network, and transmission information, which is to be transferred to the communication device. The connection information and transmission information that are stored in the server are retrieved, and a portion of the transmission information is converted into a format that is in accordance with the type of the communication device. The resultant transmission information is transmitted to the communication device based on the connection information. Additionally or alternately information stored outside the server in advance may be transmitted to the communication device.

20 Claims, 6 Drawing Sheets

METHOD AND SYSTEM FOR CONNECTING COMMUNICATION DEVICES UTILIZING CONNECTION INFORMATION OBTAINED FROM A SERVER ON A NETWORK

BACKGROUND OF THE INVENTION

1. Technical Field

The present invention relates to the creation of a connection, enabling communication across a communication network.

2. Description of the Related Art

With an Internet browser a user is able to access the Internet, one of the communication networks, while using a personal computer (PC) that incorporates a communication function, and can use the access that is afforded to search for information available from Internet servers. However, when the user desires to link up with another network, such as that which is represented by the public telephone system, based on information obtained by using an Internet browser, the user either must employ another communication device, or must record the relevant connection information and use communication software other than the Internet browser to link to the other network.

When, for example, a pager calling number is provided by a server that is connected to the Internet and a user desires to dial that number, the user either must use an ordinary telephone set to dial the recorded pager number displayed on the screen, or must temporarily terminate his or her use of the Internet browser that is being employed for the search process and dial the number using pager calling software, such as the Pocket-Bell Messenger that is available from J. C. N.land Co., Ltd. ("J. C. N.land" and "Pocket-Bell Messenger" are trademarks of J. C. N.land Co., Ltd.). If, while a user were employing the Internet browser, he or she could immediately dial a pager number extracted from information obtained using an Internet browser, a reduction would be possible in both the time required for the connection and in the amount of work required of the user.

The Internet links various types of networks, such as the Ethernet, the FDDI, X.25 packet switched networks, the ISDN and the private line, to form an interconnected grouping of networks. Hosts that are connected to different types of communication media can communicate with each other without having to take low level operating differences into consideration. A plurality of communication techniques are combined and united to provide the architecture for a wide ranging network system, one that can not be obtained using the facilities provided by isolated network architectures. Thus it is possible for a user to access information that is available worldwide. However, as the Internet is a worldwide network, and in accordance with its positive aspects does provide great advantages for users, on the network there is an increased risk that the security and secrecy of information will be compromised. That is, on a network, such as the Internet, that comprises a wide ranging, complicated grouping of interconnected networks, the environment in which the network devices and communication cables are located is not always secure, and data can be trapped by tapping an Ethernet LAN cable, or can be captured from an on-line terminal board.

On the Internet, in most cases information is exchanged across a plurality of networks. To insure there is adequate security during the exchange of secret information, data must be enciphered, and transmission routes must be selected along which highly secure locations are provided for such devices as gateways. A user, therefore, in addition to other expenses, must purchase enciphering software, and has the additional task of selecting a route along which adequate security is provided. Further, because of the restrictions that the United States has placed on the export of enciphering devices, the types of enciphering devices and the enciphering software that are available world-wide are limited. Although on-line trading, such as on-line shopping, is technically possible on the Internet, when the current Internet is used, the password and the credit card number of a user may be snared for subsequent illegal employment.

To resolve the shortcomings encountered with security, one technique that is employed involves the use of what is called a firewall. To protect an internal network (intranet) from unwanted intrusions, a host uses a firewall, which is positioned between the internal network and the Internet, to limit external data communication access. This technique, however, while it ensures that security will be maintained within an organization, does not provide any security for the exchange of information that occurs outside the firewall. For the transmission of highly secret data, the use of a network that provides greater security than the internet, such as a facsimile transmission system, is conventionally resorted to as the easiest method by which to provide the level of security that is required. In this case, while an Internet browser is being used, it is also for another network, such as the aforementioned facsimile transmission system, to be immediately employed based on information acquired by the Internet browser.

SUMMARY OF THE INVENTION

It is therefore one object of the present invention to provide a method based on connection information, which is obtained for a communication device from a server on a network, for an automatic connection to the communication device.

It is another object of the present invention to provide a method for converting, into information that is useable by a communication device, information obtained across a network from a server, and for transmitting the converted information to the communication device.

According to one aspect of the present invention, a method for transferring data from a first communication device to a second communication device comprises the steps of: accessing an Internet server whereat are stored a telephone number and transmission information for connecting the first communication device with the second communication device; transmitting, from the first communication device to the server, a command instructing the server to transmit to the first communication device data that include the telephone number and the transmission information; receiving, at the first communication device, from the server, the data that include the telephone number and the transmission information at the first communication device; storing the data that include the telephone number and the transmission information; disconnecting the first communication devices from the server; using the telephone number to connect the first communication device with the second communication device across a public telephone network; converting the transmission information into a form that is useable by a type of the second communication device; and transferring the resultant transmission information from the first communication device to the second communication device.

The "first communication device" may not only be an ordinary PC or a workstation, which incorporates an input device and a display device, but may also be a network controller or a game machine, which outputs an image signal to the receiver for a home TV set and does not incorporate a display device and from which an input device can be detached. The "second communication device" is a communication device that has a communication function, for example: a telephone set, a facsimile machine, a PC, a workstation, a portable telephone, a PHS, a pager, an electronic notebook, a notebook PC, or a palm-top PC. The "data that include a telephone number and transmission information" are data that include not only a telephone number and transmission information, but also text data that include a telephone number and transmission information. The "form that is useable by a type of the second communication device" is a form that is in accordance not only with a type of telephone set, facsimile machine, PC, workstation, portable telephone, PHS, pager, electronic notebook, notebook PC, or palm-top PC, but also with the types of encryption and coding that the second communication device employs, the types of compression, and the types of other protocols. The transmission information is data that include the contents of a message that is to be transferred to the second communication device. Data that are stored in advance in the first communication device can be appended to or substituted for the transmission information and transmitted to the second communication device.

According to another aspect of the present invention, a method for transferring data from a first communication device to a second communication device comprises the steps of: accessing across a first network a server whereat is stored connection information for connecting the first communication device with the second communication device; transmitting, from the first communication device to the server, a command instructing the server to transmit to the first communication device data stored at the server that include the connection information; receiving, at the first communication device, from the server, the data that include the connection information; and connecting the first communication device with the second communication device across a second network using the connection information.

The first network and the second network are not necessarily different networks, and may be the same network. The "connection information" is not only the telephone number of the second communication device, but is also address information for electronic mail, information concerning the use of a network for routing, and other information required for accessing the second communication device. For "connecting the first communication device with the second communication device", the disconnection of both devices from the first network is not required, and a source that was employed for connection with the first network can be used to connect the two devices. When the connection with the first network is maintained, it is possible, for example, to use two modems, with the second modem being employed to connect the first communication device with the second communication device.

According to an additional aspect of the present invention, a communication device, which has a display device and an input device and which is capable of making an Internet or a public telephone network connection by means of a modem, comprises: an Internet browser for accessing an Internet server whereat are stored a telephone number and transmission information for connecting the communication device with one other communication device across a public telephone network; means for instructing a modem to transmit a command to the server instructing transmission to the communication device of data that include the telephone number and the transmission information; means for receiving from the server, via the modem, the data that include the telephone number and the transmission information; a storage device for storing the data that include the telephone number and the transmission information; means for instructing the modem to use the telephone number to connect the communication device with the other communication device across a public telephone network; means for converting the transmission information into a form that is in accordance with a type of the other communication device; and means for transferring via the modem the resultant transmission information to the other communication device.

According to a further aspect of the present invention, a communication device, for accessing a first network and a second network, comprises: means for accessing across the first network a server whereat is stored connection information for making a connection with one other communication device across the second network; means for transmitting a command instructing the server to transmit to the communication device data that include the connection information stored at the server; means for receiving, at the communication device, from the server, the data that include the connection information; and means for using the connection information to connect the communication device with the other communication device across the second network.

According to yet one further aspect of the present invention, provided is a storage medium in which is stored a communication program for instructing connection of a communication device that has means for accessing a first network and a second network with one other communication device that exists on a second network, the communication program comprising: program code means for instructing the communication device to access, across a first network, a server whereat is stored connection information for making a connection with the other communication device across the second network; program code means for instructing the storage means to transmit to the communication device/a command instructing the server to transmit data that include the connection information stored at the server; program code means for instructing the communication device to receive, from the server, the data that include the connection information; and program code means for using the connection information to instruct connection of the communication device with the other communication device across the second network.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

A. Hardware Arrangement

Figure 1:
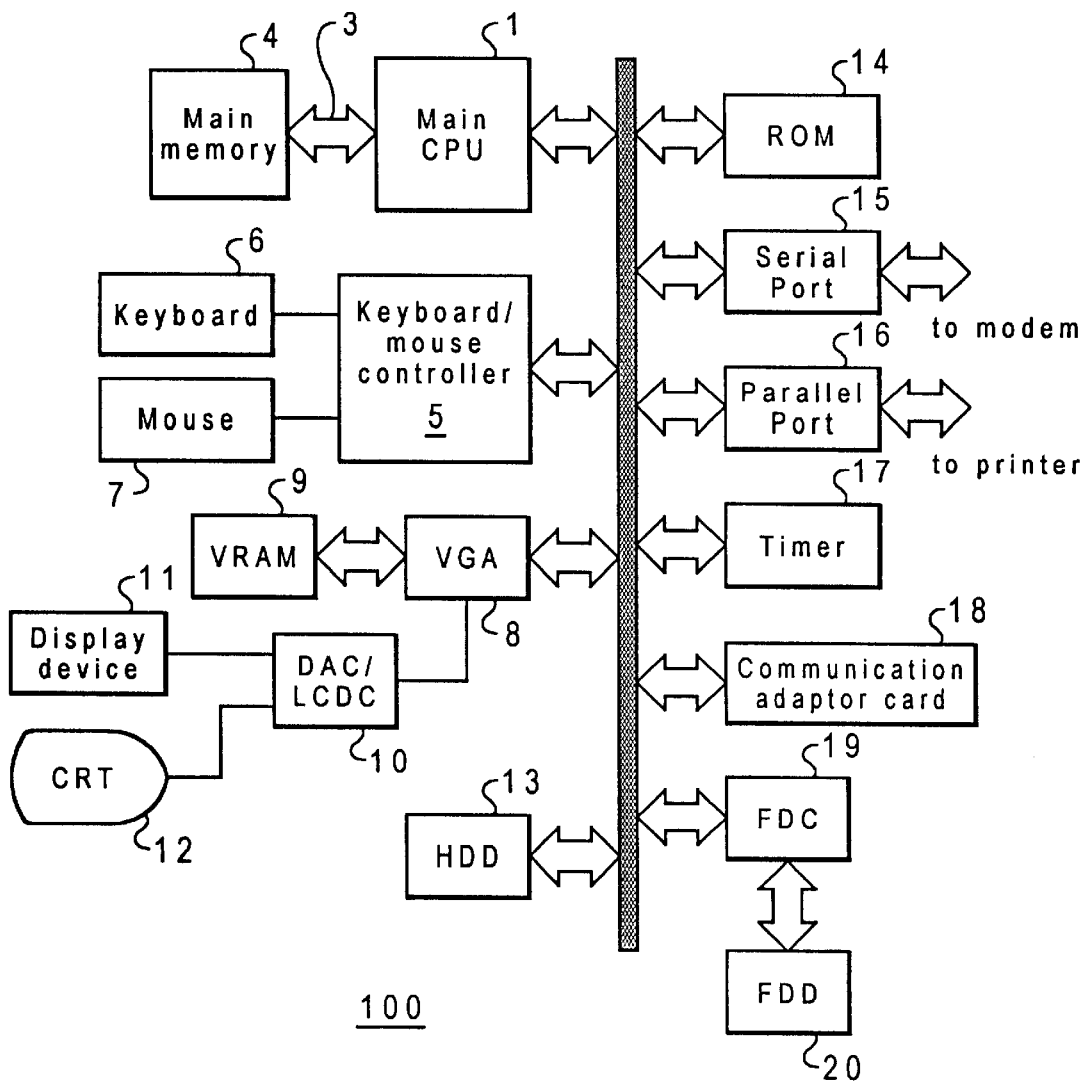
FIG. 1 is a block diagram illustrating a hardware arrangement for a communication device.

The preferred embodiments of the present invention will now be described while referring to the accompanying drawings. FIG. 1 is a schematic diagram illustrating one hardware arrangement of a communication device according to the present invention. A communication device 100 comprises, in part, a central processing unit (main CPU) 1 and a main memory 4. The CPU 1 and the main memory 4 communicate with a hard disk drive (HDD) 13, which is an auxiliary storage device, via a bus 2. A floppy disk drive (FDD) 20 (or an MO or a CD-ROM drive) is connected to the bus 2 via a floppy disk controller (FDC) 19.

A floppy disk (or a recording medium such as an MO or a CD-ROM disk) is inserted into the floppy disk drive 20 (or an MO or a CD-ROM drive). Code for a computer program, which in conjunction with an operating system provides operating instructions to the CPU 1, etc., to carry out the present invention, can be recorded on the floppy disk or the hard disk drive 13, or in a ROM 14. The code is loaded into the memory 4 for execution. The computer program code can be compressed, or can be divided into a plurality of code segments and recorded using a plurality of media.

Communication device 100 can be a system that includes user interface hardware. The user interface hardware components are, for example, a pointing device (a mouse, a joy stick, etc.) 7 or a keyboard 6 for inputting data, and a display (CRT) 12 for providing a visual data display for a user. A printer can be connected to the communication device 100 via a parallel port 16, and a modem can be connected via a serial port 15. The communication device 100 can communicate with another computer by means of the serial port 15 and a modem, or by using a communication adaptor 18. One or more paired serial ports 15 and modems can be provided. It would be easily understood that the present invention can be accomplished by an ordinary personal computer (PC) or a workstation, or a combination thereof. The above described components, however, are merely examples; not all of them are required for the present invention.

A desired operating system for the present invention is, for example, Windows (a trademark of Microsoft Corp.), OS/2 (a trademark of IBM Corp.), or the X-Window system (a trademark of MIT) on AIX (a trademark of IBM Corp.), all of which, as a standard, provide support for a graphical user interface (GUI) multi-window environment. The present invention, however, can be realized within a character based environment provided by PC-DOS (a trademark of IBM Corp.) or MS-DOS (a trademark of Microsoft Corp.), and is not limited to a specific operating system environment.

B. System Configuration

The system configuration of the present invention will now be explained while referring to the block diagram in FIG. 2. In this embodiment, a network 101 is the Internet. The Internet is not an isolated, separately identifiable entity; it is a network formed by an interconnection of networks. It has neither an owner nor a controller, and is not, in fact, susceptible to centralized control. It is a grouping together of many different networks that mutually agree to cooperate with each other. This interconnected network does not depend on a single transfer medium, and bidirectional communication can be provided using satellite links, fiber optic trunk lines, telephone lines, cable television lines, or local radio links.

A server 140 is connected to the Internet via a connector 143, and includes a controller 141 and a storage section 145. In the "World Wide Web" (WWW), a sub-network of the Internet, a user (using a system that employs what are called "hyperlinks") can easily jump from one server to another server by selecting a highlighted word, an image, or an icon (each of which is displayed as a program object). A user can search the WWW by loading a special network browser program called a "web browser" into his or her computer. One such web browser is the Web Explorer (a trademark of IBM Corp.), which IBM Corp. provides for users of the OS/2 Warp system software ("OS/2 Warp" is a trademark of IBM Corp.), that facilitates the employment of image icons and pull down menus on a desktop computer. To log on to the Internet, a user employs the Web Explorer, which is one part of the standard application group for OS/2 Warp called the IBM Internet Connection obtained from IBM Corp.

The World Wide Web (Web), which is a part of the Internet, is the dominant communication means, advertising means and ordering means in the industrial field. As the background for the present invention, there are numerous Internet browsers that are in use today. Of these, Netscape, Mosaic, and Web Explorer which is available from IBM Corp., are general examples. A browser enables a client seeking information to access servers worldwide. The information that a client selects, from among that which is stored at a server, is extracted from its sources by the server and is sent as a file or a data pack to the client. As an example, a user might submit requests, utilizing GSQL (getSQL), which is in a NCSA language, or a CGI server program that has been developed to acquire text results for a calling client.

A function of a communication device 110 is the accessing of a network 101 using a connector 113. In a first embodiment, the communication device 110 is connected to an Internet provider 105 and is logged in on the Internet. The communication device 110 includes a controller 111, a connector 113, a connection information storage section 115 and an transmission information storage section 117. The individual functional blocks of the connection information storage section 115 and the transmission information storage section 117 are stored, individually or collectively, as a data file or a program file, in a storage device, such as the hard disk 13 shown in FIG. 1. The controller 111 is provided by the execution of a control program that is stored in the main CPU 1 and a recording medium, such as the hard disk 13 shown in FIG. 1, and that is called by the main memory 4.

The recording media are, for example, a floppy disk, a CD-ROM disk, an MO disk, a PD, or a storage device connected to the network. The program code can be divided into a plurality of code segments, which are stored on a plurality of media, or the program can be compressed and stored on a single recording medium. The recording media are loaded into a system by using a variety of different drives, such as a floppy disk drive, or by using a modem and a serial port.

Another function of the communication device 110 is the accessing of a network 121 by the connector 113. In a first embodiment of the present invention, the network 121 is a public telephone network. The communication device 110 can transmit data across the public telephone network 121 to wire communication devices, such as an ordinary telephone 129, a facsimile machine 131 or a PC 133. In addition, the communication device 110 can transmit data across the public telephone network 121 and a radio station 123 to portable communication devices 125 and 127. The portable communication devices 125 and 127 are communication devices, such as portable telephones, PHSs, pagers, electronic notebooks, notebook PCs and palm-top PCs, that have a radio communication function.

The functions of the connector 113 are the receipt of connection information from the controller 111 and the accessing of the networks 101 and 121. In this embodiment of the present invention, the connector 113 can be provided by using a single modem that is connected to the serial port 15. Since the connector 113 is not limited to a common modem that can be connected to a public telephone network and also to the networks 101 and 121, any connector can be used so long as it transmits destination information for connecting the device to one of the connection points. A plurality of connectors that correspond respectively to the networks 101 and 121 may be provided, or a single connector that is used in common for the networks 101 and 121 may be provided.

In this embodiment of the present invention, the network 101 is the Internet, and a connection point 105 is an Internet provider that exists on the Internet. The network and the connection point for the present invention are not limited to those shown, however, and other networks, such as closed LANs or personal computer communication networks, may be accessed. Further, in the first embodiment, the network 121 is a public telephone network and the connection point 135 is a telephone switching device for connecting the device 110 to the public telephone network. The employment of the present invention is not thereby limited, however, and networks such as closed LANs, personal communication networks, or the Internet may be used.

Figure 2:
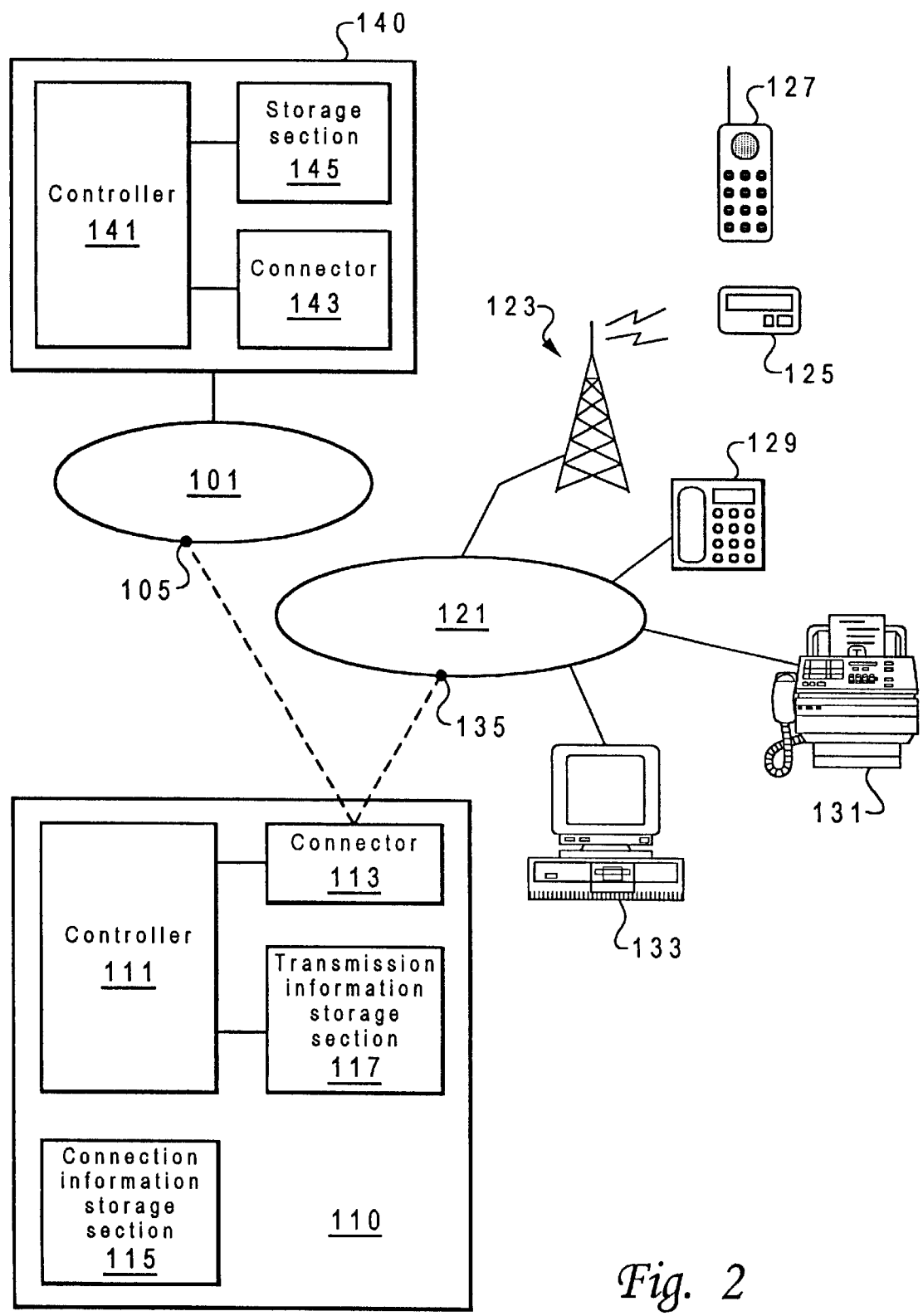
FIG. 2 is a block diagram illustrating operating components of a communication system.

Although not shown in FIG. 2, an transmission information converter, a connection information converter and a connection information input section can be provided in the communication device 110. These functional blocks are theoretical functional blocks that are not provided by the inclusion of individual hardware components, but are compound hardware components or are hardware components that are used in common.

Figure 3:
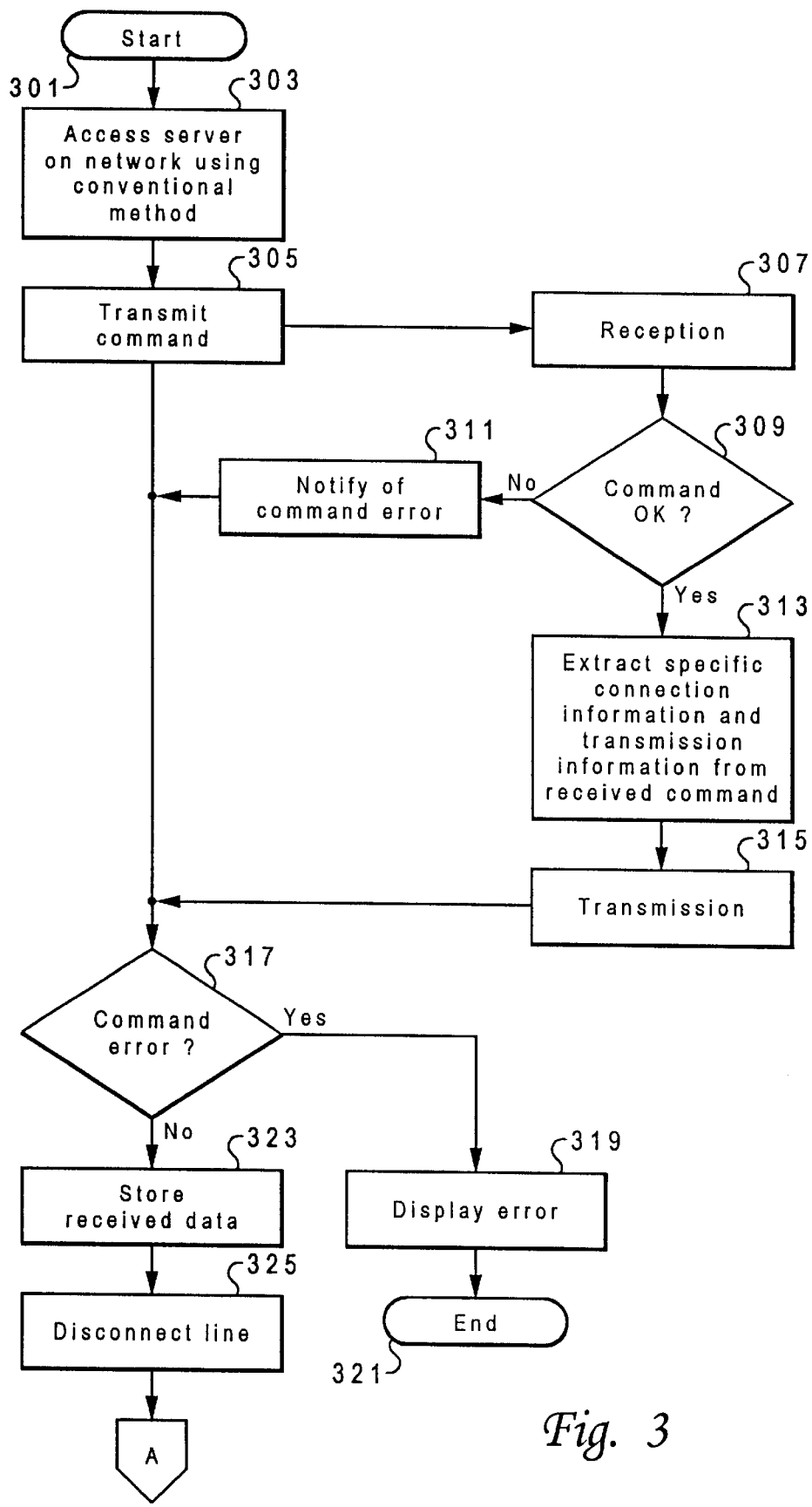
FIG. 3 is a flowchart showing communication processing according to a first embodiment of the present invention.
Figure 4:
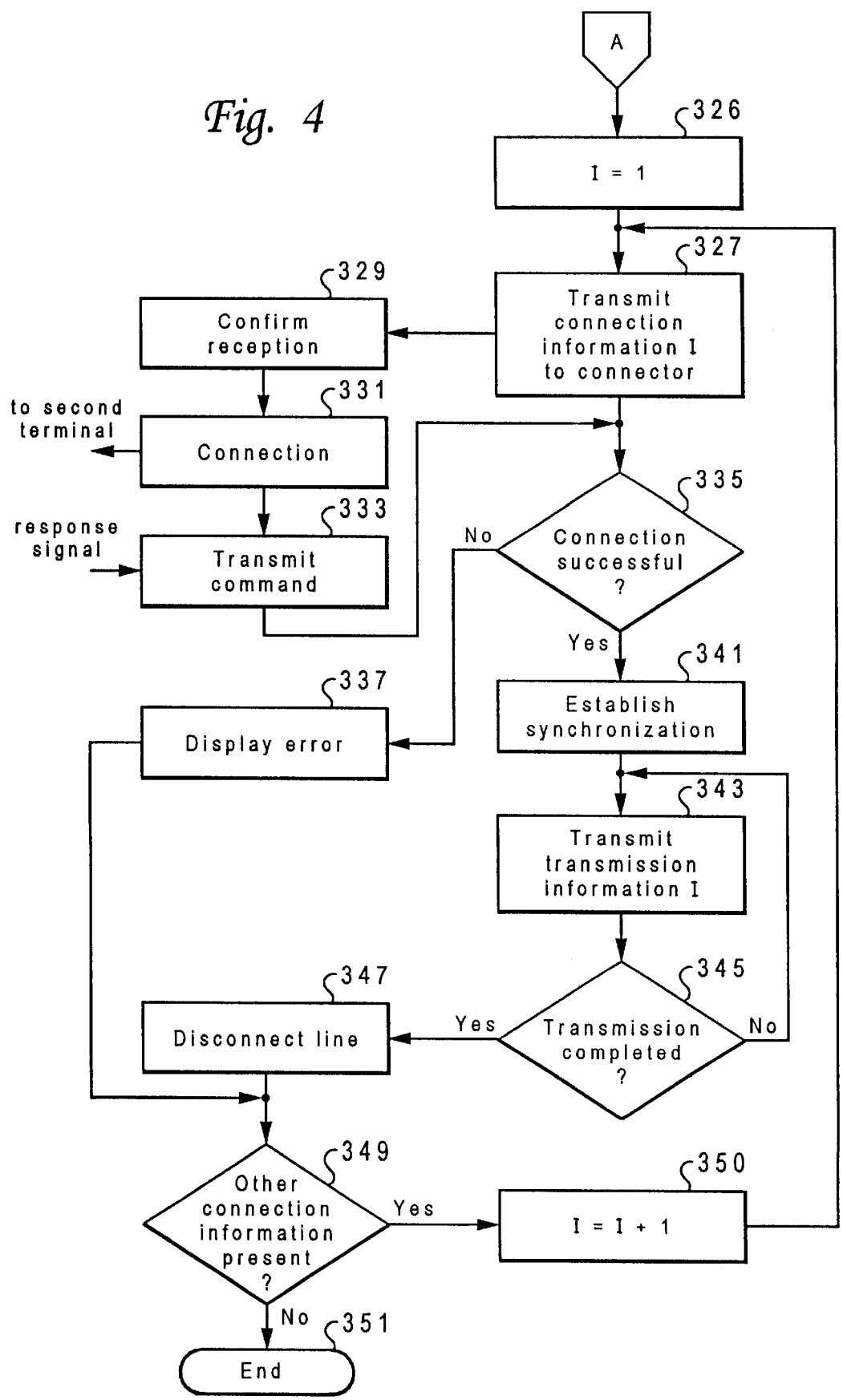
FIG. 4 is a flowchart further showing communication processing according to a first embodiment of the present invention.

FIGS. 3 and 4 are flowcharts of procedures for connecting a communication device to a connection point according to a first embodiment of the present invention. A user links up with the server 140 on the network 101 by employing known communication means in accordance with known communication procedures, and uses a known tool, such as an Internet browser, to search for and access a file on the network that includes connection information and transmission information (step 303). The user transmits a reception command to the server 140, via the connector 113, to carry out the communication method of the present invention (step 305). The command includes at least information for specifying connection information, and preferably, additionally includes information for specifying transmission information. The information that is included in the reception command for specifying connection information and transmission information may be either coordinate information, which indicates the location pointed on a screen by a client, or a specific name for connection information. So long as the transmission information is correlated with the connection information by the server, the transmission information can be designated by specifying only the connection information. If, on the other hand, the connection information and the transmission information are correlated with each other (a one-to-one correspondence or a multiple-to-one correspondence), the connection information can be specified by specifying the transmission information.

The controller 141 of the server 140 receives the command via the connector 143 (step 307), and examines the command to determine whether or not it is in the correct format (step 309). When the command is in an incorrect format, the controller 141 transmits notification of a command error through the connector 143 (step 311). When the command is in the correct format, the controller 141 extracts the connection information and the transmission information from the storage section 145 (step 313). The information extracted from the storage section 145 may be information that is stored in the storage section of another server on the network.

The controller 141 of the server 140 transmits the extracted connection information and transmission information through the connector 143 to the communication device 110 (step 315). The connection information and the transmission information are so transmitted that their information types can be identified. For example, a header indicating an information type can be attached, a delimiter can be provided, or a location where data exists, e.g., by including a byte count from the head of the data, can be designated. Also, for example, the connection information can be transmitted to the communication device during a first data transmission, and the transmission information can be transmitted thereto during a second transmission, so that the communication device 110 can distinguish the connection information from the transmission information. Further, since the transmission information can be added by the communication device, as will be described later, the transmission information is not necessarily transmitted in the present invention, and only the connection information need be transmitted.

The controller 111 of the communication device 110 receives data from the server 140 through the connector 113. When the received data indicate a command error (step 317), the contents of the error message are displayed on the display device 11 (step 319), and the processing is thereafter terminated (step 321). When the correct data have been transmitted from the server 140, the data are temporarily stored (step 323). For temporary storage of the data, it is possible to utilize the cache function of an Internet navigator, such as Netscape Navigator, to accumulate and store data while sequentially referring to the hypertext that exists in a plurality of servers. The controller 111 disconnects the line from the network 101, and the resource that was used for the connection is released (step 325).

The controller 111 initiates the connection to the network 121 based on the connection information that is stored at step 323 (step 327). In this embodiment, the controller 111 converts the connection information into a dialing command to transmit it to the modem. When the connection information is sent to the connector 113 (step 329), the connector 113 performs the connection according to the received connection information (step 331). In this manner, based on the connection information from the server 140 on the first network 101, the information can be transferred to the second communication device 125 to 133 on the second network 121.

The procedures of the following steps will be explained even though they are not required for the present invention. The second communication device responds to the connection operation initiated by the first communication device 110 and transmits a response signal indicating that the connection has been successful. The connector 113 of the first communication device 110 receives the response signal, and transmits a response command to the controller 111 (step 333). The controller 111 examines the contents of the response command to determine whether or not the connection of the second device 125 to 133 was successful (step 335). When the controller 111 ascertains that the connection was not successful, an error message is displayed on the display device 11 (step 337). In this embodiment of the present invention, the error message is displayed in correlation with the connection information.

When the controller 111 ascertains that the connection was successful, synchronization with the second device 125 to 133 is established (step 341), and the transmission information is transmitted (step 343). In this embodiment, the transmission information is converted in accordance with the type of the second communication device 125 to 133. The type of the second communication device is selected by a user when the reception command is transmitted (step 305), and information indicating the communication device type is stored in the first communication device 110. The controller 111 of the first communication device 110 utilizes the stored information to determine the type of the second communication device, so that it can convert information in accordance with the device type, and can select, from among information stored in advance, information that is in accordance with the device type, and can output the converted information and the selected information.

In an embodiment of the present invention, when transmission information is to be transmitted to a pager 125, the type of the transmission information that is stored in the server 140 is identified, and a message signal for a pager, which is stored in advance in the communication device 110, is transmitted to the second communication device 125. It is also possible for a fixed message stored in advance to be output instead of the transmission information being transmitted.

When the second communication device is a portable telephone 127 or a wire speech device, such as a telephone set, the transmission information is converted into a speech signal by known text file reading software, and the speech signal is then transmitted to the second communication device. When the second communication device is a facsimile machine 131, the transmission information is converted into a facsimile signal by a known conversion method, and the facsimile signal is transmitted to the second communication device.

When the second communication device is a computer, such as a PC 133, the transmission information can be transmitted without any conversion, or can be coded or compressed by known means before transmission. In addition, conversion of languages, such as translation from English to Japanese by translation software, is possible. Further, these conversion functions can be combined; for example, transmission information in English can be translated into Japanese and the resultant information can be converted into speech data, which is then transmitted.

When the transmission information, or the converted transmission information has been transmitted to the second communication device, or when the information that is stored in the first communication device 110 has been transmitted (step 345), the line with the second network 121 is disconnected, and the resources of the communication device 110 that were used for connection are released (step 347).

A check is then performed to determine whether or not there is another second communication device to which information is to be transmitted (step 349). When there is another second communication device, the processing at step 327 and the subsequent steps are repeated.

Figure 5:
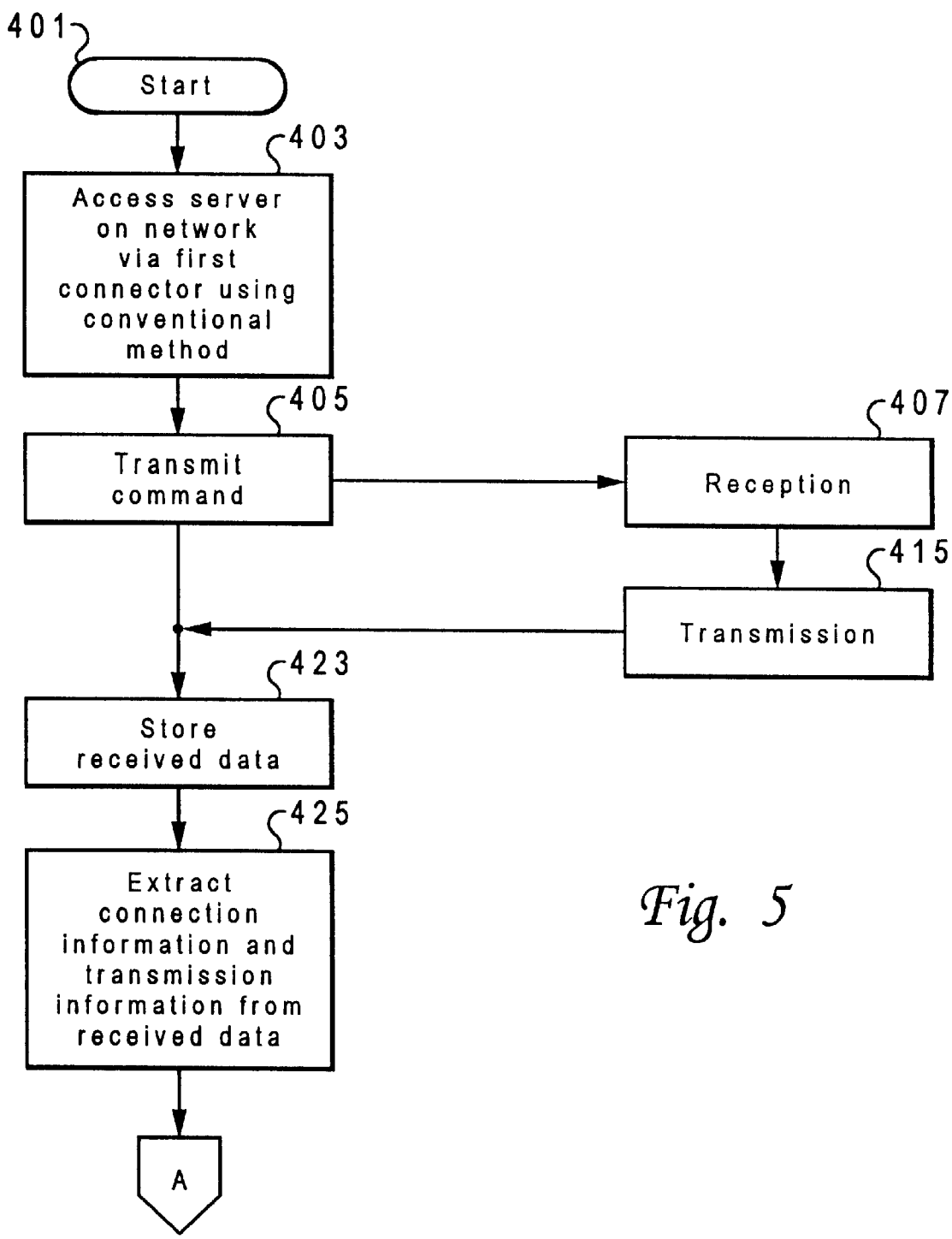
FIG. 5 is a flowchart showing communication processing according to a second embodiment of the present invention.
Figure 6:
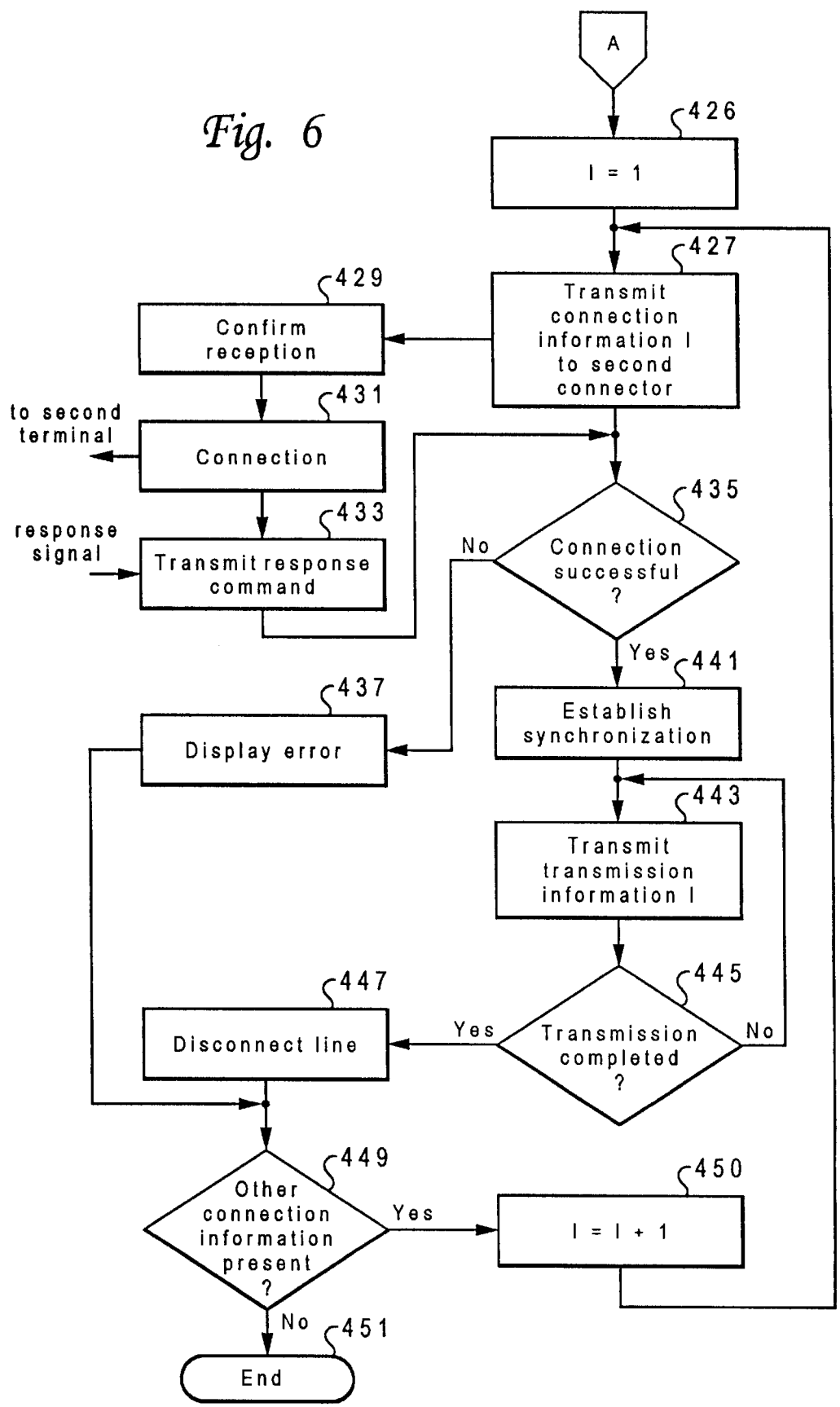
FIG. 6 is a flowchart further showing communication processing according to a second embodiment of the present invention.

FIGS. 5 and 6 are flowcharts for a second embodiment of the present invention. The greatest differences from the processing for the embodiment shown in FIGS. 3 and 4 are that the communication device 110 extracts connection information and transmission information, and that the communication device 110 has a second connector so that it can be connected with the second network while maintaining the connection with the first network. The processing in FIGS. 5 and 6 will now be described.

In a second embodiment, as well as in a first embodiment, a user links up with the server 140 on the network 101 by employing known communication means and in accordance with known communication procedures, and uses a known tool, such as the Internet browser, to search for and access a file on a network that includes connection information and transmission information (step 403). The user transmits a command to the server 140 via the connector 113 to carry out the communication method of the present invention (step 405). Unlike in the first embodiment, the command does not have to include information for specifying connection information and transmission information, and need only include information for specifying a file that the user desires to obtain.

The server 140 receives the command (step 407), and transmits to the communication device 110 the entire file, to include corresponding connection information and transmission information (step 415).

The controller 111 of the communication device 110 receives this file through the connector 113, and stores it temporarily (step 423). The controller 111 then extracts the connection information and the transmission information from the file (step 425). The connection information and the transmission information are included in the file using a format that enables their information type to be identified. For example, a header indicating information types can be attached, a delimiter can be added, or the location at which data exists, e.g., by including a byte count from the head of the data, can be designated. Since the transmission information can be added by the communication device side, the transmission of the transmission information is not required for the present invention, and only connection information need be included in the file. A plurality of connection information items and transmission information items can be included in the file, and the controller 111 can specify the transmission information items that correspond to the individual connection information items. To do this, a number or an identifier can be assigned to the connection information and the transmission information so as to identify the correspondence, or the transmission information that corresponds to connection information can be positioned before or after the corresponding connection information. In this embodiment, information that indicates the type of the second communication device is provided for corresponding connection information or transmission information. According to this embodiment, the extracted connection information and transmission information are stored temporarily in the connection information storage section 115 and the transmission information storage section 117, respectively.

The controller 111 initiates the connection to the network 121 based on the extracted connection information (step 427). In this embodiment, the controller 111 converts the connection information into a dialing command to transmit it to the modem. When the connection information is sent to the connector 113 (step 429), the connector 113 performs the connection in accordance with the received connection information (step 431). In this manner, in this embodiment also, the information can be transferred to the second communications device 125 to 133 on the second network 121 based on the connection information from the server 140 on the first network 101.

The procedures of the following steps will be explained even though they are not required for the present invention. The second communication device responds to the connection operation from the first communication device 110 and transmits a response signal indicating that the connection has been successful. The connector 113 of the first communication device 110 receives the response signal, and transmits a response command to the controller 111 (step 433). The controller 111 examines the contents of the response command to determine whether or not the connection of the second device 125 to 133 was successful (step 435). When the controller 111 ascertains that the connection was not successful, an error message is displayed on the display device 11 (step 437). In this embodiment of the present invention, the error message is displayed in correlation with the connection information.

When the controller 111 ascertains that the connection was successful, synchronization with the second device 125 to 133 is established (step 441), and the transmission information is transmitted (step 443). In this embodiment, as well as the first embodiment, the transmission information is converted in accordance with the type of the second communication device 125 to 133.

When the transmission information, or the converted transmission information has been transmitted to the second communication device, or when the information stored in the first communication device 110 has been transmitted (step 445), the line with the second network 121 is disconnected, and the resources of the communication device 110 that were used for connection are released (step 447).

A check is then performed to determine whether there is another second communication device to which information is to be transmitted (step 449). When there is another second communication device, the processing at step 427 and the subsequent steps are repeated.

As is described above, according to the present invention, the connection, by means of a simple operation, of one communication device to another communication device, based on connection information for the latter communication device obtained from a server on a network, is ensured. It is further ensured that information obtained from a server across a network will be converted into information that is in accordance with a type of another communication device, and that the converted information will be transmitted to the communication device.

While the invention has been particularly shown and described with reference to a preferred embodiment, it will be understood by those skilled in the art that various changes in form and detail may be made therein without departing from the spirit and scope of the invention.

What is claimed is:

1. A method within a communication system for transmitting data to a communication device across a network, said method comprising the steps of:

retrieving connection information to a first communication device from a server across a first network having a plurality of connection points;

transmitting said connection information to a second communication device across said first network utilizing a first communication medium; and transmitting data from said first communication device to said second communication device across a second network having a plurality of connection points utilizing said connection information in response to said retrieving step, wherein said connection information pertains to selection of a second communication medium of said second network.

2. A method as set forth in claim 1, said retrieving step comprising the steps of:

transmitting a request for said connection information from said first communication device to said server; and transferring said connection information from said server to said first communication device in response to a receipt of said request at said server.

3. A method as set forth in claim 2, wherein said first communication device includes a display having a graphical user interface, and wherein said step of transmitting a request for said connection information comprises selecting said connection information utilizing said graphical user interface.

4. A method as set forth in claim 2, wherein said step of transmitting a request for said connection information comprises the step of selecting a file within said server, said file including connection information for one or more communication devices.

5. A method as set forth in claim 4, further comprising the step of storing said file for subsequent access by said first communication device.

6. A method as set forth in claim 1, wherein said connection information includes transmission information, and wherein said transmitting step further comprises the steps of:

establishing a connection between said first communication device and said second communication device across said second network utilizing said connection information;

converting a data message, utilizing said transmission information, to a form useable by said second communication device; and transmitting said converted data message from said first communication device to said second communication device.

7. A method as set forth in claim 6, further comprising the step of extracting said data message from said transmission information prior to said converting step.

8. A method as set forth in claim 6, wherein said first communication device includes a communication adapter, said second network is a public telephone network and said connection information includes a telephone number, and wherein said step of establishing a connection between said first communication device and said second communication device further comprises the steps of:

transmitting a dialing command including said telephone number to said communication adapter;

dialing said telephone number utilizing said communication adapter; and establishing a connection through said communication adapter, across said public telephone network, between said first communication device and said second communication device.

9. A method as set forth in claim 6, said converting step further comprising at least one of the steps of:

encrypting said data message;

compressing said data message; and formatting said data message according to a protocol.

10. A communication system for transmitting data to a communication device across a network, comprising:

means for retrieving connection information to a first communication device from a server across a first network having a plurality of connection points;

means for transmitting said connection information to a second communication device across said first network utilizing a first communication medium; and means for transmitting data from said first communication device to said second communication device across a second network having a plurality of connection points utilizing said connection information in response to said retrieving means, wherein said connection information pertains to selection of a second communication medium of said second network.

11. A communication system as set forth in claim 10, wherein said plurality of connection points of said first network and said plurality of connection points of said second network include at least one common connection point.

12. A communication system as set forth in claim 10, said means for retrieving comprising:

means for transmitting a request for said connection information from said first communication device to said server; and means for transferring said connection information from said server to said first communication device in response to a receipt of said request at said server.

13. A communication system as set forth in claim 12, wherein said first communication device includes a display having a graphical user interface, said means for transmitting a request for said connection information comprising means for selecting said connection information utilizing said graphical user interface.

14. A communication system as set forth in claim 12, wherein said means for transmitting a request for said connection information comprises means for selecting a file within said server, said file including connection information for one or more communication devices.

15. A communication system as set forth in claim 14, further comprising means for storing said file for subsequent access by said first communication device.

16. A communication system as set forth in claim 10, wherein said connection information includes transmission information, and wherein said means for transmitting further comprises:

means for establishing a connection between said first communication device and said second communication device across said second network utilizing said connection information;

means for converting a data message, utilizing said transmission information, to a form useable by said second communication device; and means for transmitting said converted data message from said first communication device to said second communication device.

17. A communication system as set forth in claim 16, wherein said data message is extracted from said transmission information.

18. A communication system as set forth in claim 16, wherein said first communication device includes a communication adapter, said second network is a public telephone network and said connection information includes a telephone number, said means for establishing a connection between said first communication device and said second communication device further comprising:

means for transmitting a dialing command including said telephone number to said communication adapter;

means for dialing said telephone number utilizing said communication adapter; and means for establishing a connection through said communication adapter, across said public telephone network, between said first communication device and said second communication device.

19. A communication system as set forth in claim 16, said means for converting further comprising at least one of encryption information, compression information, and protocol information.

20. A computer program product to be utilized within a communication system for transmitting data to a communication device across a network, said computer program product comprising:

media useable by said communication system for storing and executing instruction means;

instruction means, embodied within said media for retrieving connection information to a first communication device from a server across a first network having a plurality of connection points;

instruction means, embodied within said media, for transmitting said connection information to a second communication device across a first network utilizing a first communication medium; and instruction means, embodied within said media for transmitting data from said first communication device to a second communication device across said second network having a plurality of connection points utilizing said connection information in response to said retrieving instruction means, wherein said connection information pertains to selection of a second communication medium of said second network.

* * * * *